(12) United States Patent
Chang et al.

(10) Patent No.: US 7,809,403 B2
(45) Date of Patent: Oct. 5, 2010

(54) STRATOSPHERIC PLATFORMS COMMUNICATION SYSTEM USING ADAPTIVE ANTENNAS

(75) Inventors: Donald C. D. Chang, Thoussand Oaks, CA (US); Wah L. Lim, Newport Beach, CA (US); Ming U. Chang, Rancho Palos Verdes, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 289 days.

(21) Appl. No.: 09/858,989

(22) Filed: May 15, 2001

(65) Prior Publication Data

US 2002/0128045 A1    Sep. 12, 2002

Related U.S. Application Data

(60) Provisional application No. 60/266,684, filed on Feb. 5, 2001, provisional application No. 60/262,717, filed on Jan. 19, 2001, provisional application No. 60/262,701, filed on Jan. 19, 2001.

(51) Int. Cl.
*H04M 1/00* (2006.01)

(52) U.S. Cl. .................... 455/562.1; 455/431

(58) Field of Classification Search ............... 455/561, 455/562.1, 424, 429, 430, 431, 427, 11.1, 455/12.1
See application file for complete search history.

(56) References Cited

U.S. PATENT DOCUMENTS

| | | | |
|---|---|---|---|
| 3,541,553 A | 11/1970 | Gubin | |
| 3,720,953 A | 3/1973 | Ajioka et al. | ............ 343/771 |
| 4,085,368 A * | 4/1978 | Yeh | ............ 375/332 |
| 4,236,161 A | 11/1980 | Ohm | |
| 4,343,005 A | 8/1982 | Han et al. | |
| 4,364,052 A | 12/1982 | Ohm | |
| 4,500,883 A | 2/1985 | Gutleber | |
| 4,631,499 A | 12/1986 | Kasperkovitz | |
| 4,635,063 A | 1/1987 | Chang et al. | ............ 342/380 |
| 4,727,503 A * | 2/1988 | McWhirter | ............ 708/200 |
| 4,799,065 A | 1/1989 | Thompson | |
| 4,812,788 A | 3/1989 | Wong et al. | |
| 4,823,341 A | 4/1989 | Rosen | |
| 4,872,015 A | 10/1989 | Rosen | |
| 4,893,316 A | 1/1990 | Janc et al. | |
| 4,901,307 A | 2/1990 | Gilhousen et al. | |

(Continued)

FOREIGN PATENT DOCUMENTS

EP    0 549 220 A2    6/1993

(Continued)

OTHER PUBLICATIONS

U.S. Appl. No. 09/584,012, filed May 30, 2000, Chang, et al.

(Continued)

*Primary Examiner*—George Eng
*Assistant Examiner*—Marcos L Torres

(57) ABSTRACT

A communication system has a high altitude device having an adaptive antenna with a plurality of main array antenna elements for generating a plurality of communication beams. The system further includes a gateway station coupled to the high altitude device. The gateway station forms a plurality of beams commands by communicating a plurality of control signals to the high altitude device station to form the communication beams.

17 Claims, 10 Drawing Sheets

U.S. PATENT DOCUMENTS

| | | | |
|---|---|---|---|
| 5,017,927 A | 5/1991 | Agrawal et al. | |
| 5,077,562 A | 12/1991 | Chang et al. | 342/368 |
| 5,081,464 A | 1/1992 | Renshaw | |
| 5,109,390 A | 4/1992 | Gilhousen et al. | |
| 5,151,706 A | 9/1992 | Roederer et al. | |
| 5,218,619 A | 6/1993 | Dent | |
| 5,233,626 A | 8/1993 | Ames | |
| 5,257,030 A | 10/1993 | Aoki et al. | |
| 5,278,863 A | 1/1994 | Briskman | |
| 5,319,673 A | 6/1994 | Briskman | |
| 5,327,455 A | 7/1994 | De Gaudenzi et al. | |
| 5,339,330 A | 8/1994 | Mallinckrodt | |
| 5,345,448 A | 9/1994 | Keskitalo | |
| 5,361,074 A | 11/1994 | Hansen | |
| 5,361,398 A | 11/1994 | Christian et al. | |
| 5,379,320 A | 1/1995 | Fernandes et al. | |
| 5,408,237 A | 4/1995 | Patterson et al. | |
| 5,410,731 A | 4/1995 | Rouffet et al. | |
| 5,423,058 A | 6/1995 | Cudak et al. | |
| 5,423,059 A | 6/1995 | LoGalbo et al. | |
| 5,485,485 A | 1/1996 | Briskman et al. | |
| 5,543,805 A * | 8/1996 | Thaniyavarn | 342/368 |
| 5,548,801 A * | 8/1996 | Araki et al. | 455/13.1 |
| 5,550,809 A | 8/1996 | Bottomley et al. | |
| 5,552,798 A | 9/1996 | Dietrich et al. | |
| 5,555,257 A | 9/1996 | Dent | |
| 5,568,484 A | 10/1996 | Margis | |
| 5,572,216 A | 11/1996 | Weinberg et al. | |
| 5,584,047 A | 12/1996 | Tuck | |
| 5,589,834 A | 12/1996 | Weinberg | 342/354 |
| 5,592,471 A | 1/1997 | Briskman | |
| 5,594,941 A | 1/1997 | Dent | |
| 5,608,722 A | 3/1997 | Miller | |
| 5,612,701 A | 3/1997 | Diekelman | 342/354 |
| 5,625,864 A | 4/1997 | Budow et al. | |
| 5,659,350 A | 8/1997 | Hendricks et al. | |
| 5,666,128 A | 9/1997 | Murray et al. | |
| 5,682,195 A | 10/1997 | Hendricks et al. | |
| 5,684,799 A | 11/1997 | Bigham et al. | |
| 5,689,568 A | 11/1997 | Laborde | |
| 5,715,516 A * | 2/1998 | Howard et al. | 455/422.1 |
| 5,727,065 A | 3/1998 | Dillon | |
| 5,729,279 A | 3/1998 | Fuller | |
| 5,732,351 A | 3/1998 | Olds et al. | |
| 5,734,982 A | 3/1998 | Endo et al. | 455/450 |
| 5,740,164 A | 4/1998 | Liron | |
| 5,751,971 A | 5/1998 | Dobbins et al. | |
| 5,754,139 A | 5/1998 | Turcotte et al. | |
| 5,764,187 A | 6/1998 | Rudish et al. | |
| 5,790,070 A | 8/1998 | Natarajan et al. | |
| 5,790,541 A | 8/1998 | Patrick et al. | |
| 5,790,546 A | 8/1998 | Dobbins et al. | |
| 5,810,284 A | 9/1998 | Hibbs et al. | |
| 5,839,053 A | 11/1998 | Bosch et al. | |
| 5,852,721 A | 12/1998 | Dillon et al. | |
| 5,856,804 A * | 1/1999 | Turcotte et al. | 342/371 |
| 5,862,480 A | 1/1999 | Wild et al. | 455/432 |
| 5,864,579 A | 1/1999 | Briskman | |
| 5,867,109 A | 2/1999 | Wiedeman | |
| 5,878,034 A | 3/1999 | Hershey et al. | |
| 5,884,142 A | 3/1999 | Wiedeman et al. | |
| 5,890,067 A | 3/1999 | Chang et al. | |
| 5,894,590 A | 4/1999 | Vatt et al. | |
| 5,903,549 A | 5/1999 | von der Embse et al. | 370/310 |
| 5,907,816 A | 5/1999 | Newman et al. | |
| 5,909,460 A | 6/1999 | Dent | |
| 5,909,470 A | 6/1999 | Barratt et al. | |
| 5,917,447 A | 6/1999 | Wang et al. | |
| 5,918,157 A | 6/1999 | Wiedeman et al. | |
| 5,946,625 A | 8/1999 | Hassan et al. | |
| 5,949,766 A | 9/1999 | Ibanez-Meier et al. | 370/316 |
| 5,956,619 A | 9/1999 | Gallagher et al. | |
| 5,963,862 A | 10/1999 | Adiwoso et al. | |
| 5,966,371 A | 10/1999 | Sherman | |
| 5,973,647 A | 10/1999 | Barrett et al. | 343/713 |
| 5,974,317 A | 10/1999 | Djuknic et al. | |
| 5,982,337 A | 11/1999 | Newman et al. | 343/816 |
| 5,990,839 A | 11/1999 | Schefte et al. | |
| 5,990,928 A | 11/1999 | Sklar et al. | |
| 5,991,329 A * | 11/1999 | Lomp et al. | 375/130 |
| 5,995,062 A | 11/1999 | Denney et al. | |
| 5,995,725 A | 11/1999 | Dillon | |
| 5,995,726 A | 11/1999 | Dillon | |
| 6,014,372 A | 1/2000 | Kent et al. | |
| 6,016,124 A | 1/2000 | Lo et al. | 342/354 |
| 6,016,388 A | 1/2000 | Dillon | |
| 6,016,421 A | 1/2000 | Weiss et al. | 455/63 |
| 6,018,316 A | 1/2000 | Rudish et al. | |
| 6,020,845 A | 2/2000 | Weinberg et al. | 342/354 |
| 6,023,463 A | 2/2000 | Wiedeman et al. | |
| 6,034,634 A | 3/2000 | Karlsson et al. | |
| 6,047,186 A | 4/2000 | Yu et al. | |
| 6,061,562 A | 5/2000 | Martin et al. | |
| 6,084,541 A | 7/2000 | Sayegh | |
| 6,084,892 A | 7/2000 | Benash et al. | |
| 6,088,341 A | 7/2000 | Hinedi et al. | |
| 6,104,911 A | 8/2000 | Diekelman | |
| 6,105,060 A | 8/2000 | Rothblatt | |
| 6,111,542 A | 8/2000 | Day | |
| 6,118,824 A | 9/2000 | Smith et al. | |
| 6,118,998 A | 9/2000 | Wismer et al. | |
| 6,128,276 A | 10/2000 | Agee | |
| 6,147,658 A | 11/2000 | Higashi et al. | 343/853 |
| 6,151,308 A | 11/2000 | Ibanez-Meier et al. | 370/316 |
| 6,151,496 A | 11/2000 | Richards et al. | |
| 6,157,621 A | 12/2000 | Brown et al. | |
| 6,157,811 A | 12/2000 | Dent | |
| 6,160,994 A | 12/2000 | Wiedeman | |
| 6,161,141 A | 12/2000 | Dillon | |
| 6,167,237 A | 12/2000 | Rapeli | |
| 6,167,263 A | 12/2000 | Campbell | |
| 6,167,286 A | 12/2000 | Ward et al. | |
| 6,173,178 B1 | 1/2001 | Hammill et al. | |
| 6,173,190 B1 | 1/2001 | Usui | |
| 6,188,896 B1 | 2/2001 | Perahia et al. | |
| 6,195,037 B1 | 2/2001 | Gross et al. | |
| 6,201,797 B1 | 3/2001 | Leuca et al. | |
| 6,204,822 B1 | 3/2001 | Cardiasmenos et al. | |
| 6,208,307 B1 | 3/2001 | Frisco et al. | |
| 6,208,858 B1 | 3/2001 | Antonio et al. | |
| 6,215,776 B1 | 4/2001 | Chao | |
| 6,240,072 B1 | 5/2001 | Lo et al. | |
| 6,249,514 B1 * | 6/2001 | Campanella | 370/316 |
| 6,259,415 B1 | 7/2001 | Kumpfbeck et al. | |
| 6,266,528 B1 | 7/2001 | Farzaneh | |
| 6,269,244 B1 | 7/2001 | Alperovich et al. | |
| 6,272,317 B1 | 8/2001 | Houston et al. | |
| 6,278,876 B1 | 8/2001 | Joshi et al. | |
| 6,289,004 B1 | 9/2001 | Mesecher et al. | |
| 6,295,440 B2 | 9/2001 | Chang et al. | |
| 6,301,231 B1 | 10/2001 | Hassan et al. | |
| 6,308,045 B1 | 10/2001 | Wright et al. | |
| 6,308,085 B1 | 10/2001 | Shoki | 455/562 |
| 6,314,269 B1 | 11/2001 | Hart et al. | |
| 6,317,420 B1 | 11/2001 | Schiff | |
| 6,324,398 B1 | 11/2001 | Lanzerotti et al. | |
| 6,336,030 B2 | 1/2002 | Houston et al. | |
| 6,337,911 B1 | 1/2002 | Dillon | |
| 6,337,980 B1 | 1/2002 | Chang et al. | |
| 6,338,131 B1 | 1/2002 | Dillon | |
| 6,339,611 B1 | 1/2002 | Antonio et al. | |
| 6,339,707 B1 | 1/2002 | Wainfan et al. | |
| 6,339,708 B1 | 1/2002 | Wang | |
| 6,343,205 B1 | 1/2002 | Threadgill et al. | |

| | | | |
|---|---|---|---|
| 6,353,643 B1 | 3/2002 | Park | |
| 6,366,256 B1 | 4/2002 | Ramanujam et al. | |
| 6,366,761 B1 | 4/2002 | Montpetit | |
| 6,380,893 B1* | 4/2002 | Chang et al. | 342/373 |
| 6,385,434 B1 | 5/2002 | Chuprun et al. | |
| 6,385,647 B1 | 5/2002 | Willis et al. | |
| 6,388,615 B1 | 5/2002 | Chang et al. | |
| 6,388,634 B1 | 5/2002 | Ramanujam et al. | |
| 6,392,611 B1 | 5/2002 | Smith et al. | |
| 6,393,303 B1 | 5/2002 | Katz | |
| 6,400,925 B1 | 6/2002 | Tirabassi et al. | |
| 6,408,180 B1 | 6/2002 | McKenna et al. | |
| 6,414,646 B2 | 7/2002 | Luh | |
| 6,424,646 B1 | 7/2002 | Gerszberg et al. | |
| 6,429,823 B1 | 8/2002 | Bains et al. | |
| 6,434,384 B1 | 8/2002 | Norin et al. | |
| 6,445,777 B1 | 9/2002 | Clark | |
| 6,452,962 B1 | 9/2002 | Linsky et al. | |
| 6,456,846 B2 | 9/2002 | Norin et al. | |
| 6,463,282 B2 | 10/2002 | Norin et al. | |
| 6,463,294 B1 | 10/2002 | Holma et al. | |
| 6,473,411 B1 | 10/2002 | Kumaki et al. | |
| 6,484,213 B1 | 11/2002 | Nouri | |
| 6,507,314 B2 | 1/2003 | Chang et al. | |
| 6,507,739 B1* | 1/2003 | Gross et al. | 455/431 |
| 6,510,172 B1 | 1/2003 | Miller | |
| 6,513,758 B1* | 2/2003 | Lloyd | 244/129.1 |
| 6,519,477 B1 | 2/2003 | Baier et al. | |
| 6,526,288 B1 | 2/2003 | Khalifa et al. | |
| 6,529,706 B1 | 3/2003 | Mitchell | |
| 6,556,809 B1 | 4/2003 | Gross et al. | |
| 6,556,845 B1* | 4/2003 | Ide et al. | 455/562.1 |
| 6,559,797 B1 | 5/2003 | Chang | |
| 6,560,292 B1 | 5/2003 | Lundby et al. | |
| 6,598,014 B1 | 7/2003 | Rabideau et al. | |
| 6,615,024 B1 | 9/2003 | Boros et al. | |
| 6,639,551 B2 | 10/2003 | Li et al. | |
| 6,704,543 B1* | 3/2004 | Sharon et al. | 455/12.1 |
| 6,756,937 B1* | 6/2004 | Chang et al. | 342/354 |
| 6,768,906 B2 | 7/2004 | Matthews et al. | |
| 6,781,968 B1* | 8/2004 | Colella et al. | 370/316 |
| 6,804,515 B1* | 10/2004 | McCraw et al. | 455/431 |
| 6,819,943 B2 | 11/2004 | Dalal | |
| 6,941,138 B1 | 9/2005 | Chang et al. | |
| 7,369,847 B1 | 5/2008 | Rosen et al. | |
| 2001/0000167 A1 | 4/2001 | Chang et al. | |
| 2001/0004604 A1 | 6/2001 | Toshimitsu et al. | 455/562 |
| 2001/0038342 A1 | 11/2001 | Foote | |
| 2001/0048389 A1 | 12/2001 | Nakagawa | |
| 2001/0055320 A1 | 12/2001 | Pierzga et al. | |
| 2002/0006795 A1 | 1/2002 | Norin | |
| 2002/0050946 A1 | 5/2002 | Chang et al. | |
| 2002/0053987 A1 | 5/2002 | Chang et al. | |
| 2002/0072332 A1 | 6/2002 | Chang et al. | |
| 2002/0072360 A1 | 6/2002 | Chang et al. | |
| 2002/0072361 A1 | 6/2002 | Knoblach et al. | |
| 2002/0072374 A1 | 6/2002 | Chang et al. | |
| 2002/0073437 A1 | 6/2002 | Chang et al. | |
| 2002/0080732 A1 | 6/2002 | Feria et al. | |
| 2002/0081969 A1 | 6/2002 | Chang et al. | |
| 2002/0106041 A1 | 8/2002 | Chang et al. | |
| 2002/0118654 A1 | 8/2002 | Chang et al. | |
| 2002/0126042 A1 | 9/2002 | Chang et al. | |
| 2002/0128044 A1 | 9/2002 | Chang et al. | |
| 2002/0128045 A1 | 9/2002 | Chang et al. | |
| 2002/0132643 A1 | 9/2002 | Chang et al. | |
| 2002/0140602 A1 | 10/2002 | Chang et al. | |
| 2002/0168991 A1 | 11/2002 | Kochanski et al. | |
| 2003/0076258 A1 | 4/2003 | Chang et al. | |

FOREIGN PATENT DOCUMENTS

| | | |
|---|---|---|
| EP | 0 682 416 A2 | 11/1995 |
| EP | 0 776 099 A2 | 5/1997 |
| EP | 0 860 952 A2 | 8/1998 |
| EP | 0 961 416 A | 12/1999 |
| EP | 1 026 778 A2 | 9/2000 |
| EP | 1 037 403 A2 | 9/2000 |
| EP | 1 122 813 A2 | 8/2001 |
| EP | 1 139 583 A2 | 10/2001 |
| EP | 1 148 662 A2 | 10/2001 |
| EP | 1 152 552 A2 | 11/2001 |
| EP | 1 158 698 A2 | 11/2001 |
| EP | 1 161 001 A2 | 12/2001 |
| GB | 2 349 045 A | 10/2000 |
| JP | 10-209939 | 8/1998 |
| JP | 11-8579 | 1/1999 |
| JP | 11 261474 A | 9/1999 |
| JP | 2001345747 A | 12/2001 |
| WO | WO 90/13186 | 11/1990 |
| WO | WO 97/07609 | 2/1997 |
| WO | WO 99/16201 | 4/1999 |
| WO | WO 00/14902 A2 | 3/2000 |
| WO | WO 01/20719 | 3/2001 |
| WO | WO 01/91310 A3 | 11/2001 |
| WO | WO 01/93458 A2 | 12/2001 |
| WO | WO 01/94969 A3 | 12/2001 |
| WO | WO 01/95520 A2 | 12/2001 |
| WO | WO 01/95522 A1 | 12/2001 |
| WO | WO 01/95523 A3 | 12/2001 |
| WO | WO 02/058186 A2 | 7/2002 |
| WO | WO 02/058272 A2 | 7/2002 |

OTHER PUBLICATIONS

U.S. Appl. No. 09/611,753, filed Jul. 7, 2000, Chang, et al.
U.S. Appl. No. 09/550,505, filed Apr. 17, 2000, Chang, et al.
U.S. Appl. No. 09/376,941, filed Aug. 18, 1999, Chang, et al.
Yokosuka Research Park, "*The First Stratospheric Platform Systems Workshop*", May 12-13, 1999, pp. 1-216.
M. Oodo, R. Miura, Y. Hase, "*Onboard DBF Antenna for Stratospheric Platform*", IEEE Conference on Phased Array Systems and Technology, California, May 21-25, 2000, pp. 125-128.
R. Suzuki, Y. Matsumoto, R. Miura and N. Hamamoto, "*Mobile TDM/TDMA System With Active Array Antenna*", Global Telecommunications Conference, 1991. GLOBECOM '91. Countdown to the New Millennium, Featuring a Mini-Theme on Personal Communication Services, vol. 3,Dec. 2-5, 1991, pp. 1569-1573.
U.S. Appl. No. 09/858,387, filed May 15, 2001, Donald C. D. Chang et al.
U.S. Appl. No. 09/858,956, filed May 15, 2001, Donald C. D. Chang et al.
Chan, K. K., et. al., "A Circularly Polarized Waveguide Array for Leo Satellite Communications", Antennas and Propagation Society, 1999, IEEE International Symposium, vol. 1, Jul. 11-16, 1999, pp. 154-157.
Chiba, Isamu et. al., "Digital Beam Forming (DBF) Antenna System for Mobile Communications", IEEE AES Systems Magazine, Sep. 1997, pp. 31-41.
Djuknic, Goran et al., "Establishing Wireless Communications Services via High-Aeronautical platforms: A Concept Whose Time Has Come?" IEEE Communications Magazine, Sep. 1997, pp. 128-135.
Martin, James N. et al., "HALO Network—The Cone of Commerce", http://www.angelhalo.com/techpaper2, copyright 1997-1998.
Martin, James N. et al., "HALO Network—Broadband Wireless Services from High Altitude Long Operation (HALO) Aircraft", http://www.angelhalo.com/techpaper2, copyright 1997-1998.
Akyildiz, Ian F. et al., "HALO (High Altitude Long Operation): A Broadband Wireless Metropolitan Area Network", IEEE International Workshop on Mobile Multimedia Communications, Nov. 1999, pp. 271-275.
Sato, Kazuo et al., "Development and Field Experiments of Phased Array Antenna for Land Vehicle Satellite Communications", IEEE Antennas and Propagation Society International Symposium, Jul. 1992, pp. 1073-1076.

Sakakibara, Kunio et. al, "A Two-Beam Slotted Leaky Waveguide Array for Mobile Reception of Dual-Polarization DBS", IEEE Transactions on Vehicular Technology, vol. 48, No. 1, Jan. 1999, pp. 1-7.

U.S. Appl. No. 09/661,725, filed Sep. 14, 2000, Chang et al.

U.S. Appl. No. 09/661,986, filed Sep. 14, 2000, Rosen et al.

U.S. Appl. No. 09/644,224, filed Aug. 21, 2000, Chang et al.

Miura, Ryu et. al, "A DBF Self-Beam Steering Array Antenna for Mobile Satellite Applications Using Beam-Space Maximal-Ratio Combination", IEEE Trans. on Vehicular Technology, vol. 48, No. 3, May 1999, pp. 665-675.

Colella, Nicholas J. et al., "The HALO Network™", IEEE Communications Magazine, Jun. 2000, pp. 142-148.

Colella, Nicholas J. et al., "High Speed Internet Access via Stratospheric HALO Aircraft", INET 99 Proceedings, Internet Society, Technology, Wireless, 13 pages, Jun. 8, 1999.

Colella, Nicholas, "Halo Network—The Birth of Stratospheric Communications Services & the Decline of Satellite Networks", http://www.angelhalo.com/techpaper6, Copyright 1997-1999.

U.S. Appl. No. 09/644,225, filed Aug. 21, 2000, Hagen et al.

U.S. Appl. No. 09/587,960, filed Jun. 6, 2000, Yung et al.

U.S. Appl. No. 09/587,759, filed Jun. 6, 2000, Yung et al.

U.S. Appl. No. 09/576,648, filed May 22, 2000, Yung et al.

U.S. Appl. No. 09/566,759, filed May 5, 2000, Novak et al.

Casewell, I.E., "The provisions of GSM cellular radio environments within passenger aircraft operating over Europe", Racal Res. Ltd., Walton-on-Thames, Mobile Radio and Personal Communications, 1989, Fifth International Conference, Dec. 11, 1989-Dec. 14, 1989, pp. 172-176.

Canadian Office Communication dated Dec. 12, 2005 in counterpart Canadian patent application No. 2434221.

Canadian Office Communication dated Nov. 30, 2006 in counterpart Canadian patent application No. 2434221.

EPO Communication dated Nov. 25, 2003 in counterpart European patent application No. 02707428.5.

EPO Communication dated Jun. 2, 2005 in counterpart European patent application No. 02707428.5.

Mexican Office Communication dated Mar. 31, 2006 in counterpart Mexican patent application No. 3006453.

Final Rejection dated Mar. 13, 2009 in U.S. Appl. No. 09/858,387, filed May 15, 2001 by Donald C.D. Chang et al.

Non-final Office action dated Oct. 29, 2009 in U.S. Appl. No. 09/858,387, filed Mar. 15, 2001 by Donald C. D. Chang et al.

Non-final Office action dated Jan. 27, 2010 in U.S. Appl. No. 12/046,271, filed Mar. 11, 2008 by Harold A. Rosen et al.

Non-final Office dated Apr. 26, 2010 in U.S. Appl. No. 11/928,577 filed Oct. 30, 2007 by Donlad C.D. Chang et al.

Non-final Office action dated Jul. 21, 2010 in U.S. Appl. No. 12/046,271 filed Mar. 11, 2008 by Harold A. Rosen et al.

* cited by examiner

STRATOSPHERIC PLATFORMS COMMUNICATION SYSTEM USING ADAPTIVE ANTENNAS

RELATED APPLICATION

The present application claims priority to provisional applications Ser. No. 60/266,684 filed on Feb. 5, 2001; Ser. No. 60/262,717 filed on Jan. 19, 2001; and Ser. No. 60/262,701 filed on Jan. 19, 2001; each of which are incorporated by reference herein. The present application is also related to U.S. patent application entitled; "Multiple Basestation Communication System Having Adaptive Antennas" Ser. No. 09/858,956; and "Communication System For Mobile Users Using Adaptive Antenna" Ser. No. 09/858,387; filed simultaneously herewith and incorporated by reference herein.

TECHNICAL FIELD

The present invention relates generally to a communication system and more particularly, to a communication system using a ground-based base station and a gateway station that performs beam control at the gateway station.

BACKGROUND ART

In this communication age, content providers are increasingly investigating ways in which to provide more content to users as well as interfacing with users.

The Internet has increased the need for consumer information at high speeds. DSL and cable modems are increasing in popularity because they provide higher byte rates than telephone and modem-based systems. Providing broadband access through cable or DSL service requires increased infrastructure. That is, cables must be laid through which service is provided. Cables are time consuming and costly to provide as well as costly to maintain.

Because of high competition, cost for providing service is an important factor. Also, providing high data rates is also an important factor.

Limitations to the number of users may be inhibited by interference in systems. For example, for every beam having a main lobe, a parasitic number of side lobes exist which may cause interference with beams using the same system resource such as frequency.

It would therefore be desirable to provide a mobile communication system that is capable of rapid deployment, is easy to change, should the technology inevitably change and reduces the amount of interference with adjacent beams to permit high throughput.

SUMMARY OF THE INVENTION

The present invention provides a communication system that allows rapid deployment and provides interference rejection. The present invention is suitable for both fixed users such as those positioned in a building or home or for mobile users.

In one aspect of the invention, a communication system has a high altitude device having an adaptive antenna with a plurality of main array antenna elements for generating a plurality of communication beams. The system further includes a gateway station coupled to the high altitude device. The gateway station forms a plurality of beams commands by communicating plurality of a control signals to the high altitude device station to form the communication beams.

In a further aspect of the invention, a method of controlling a communication system comprises the steps of:

forming a plurality of multiple dynamic communication beams in a gateway station by scaling a plurality of elements;

coupling the multiple dynamic communication beams to a plurality of stratospheric platforms; and generating the multiple dynamic communication beams in response to the scaling of elements by a plurality of stratospheric platforms.

One advantage of the invention is that due to the interference detection, system throughput is increased over conventional systems.

Another advantage of the invention is that by locating a majority of the processing remote from the base stations, overall costs of systems may be further reduced.

Other features and advantages of the present invention using remote digital beam forming are readily apparent from the following detailed description of the best mode for carrying out the invention when taken in connection with the accompanying drawings.

BEST MODES FOR CARRYING OUT THE INVENTION

Figure 1:
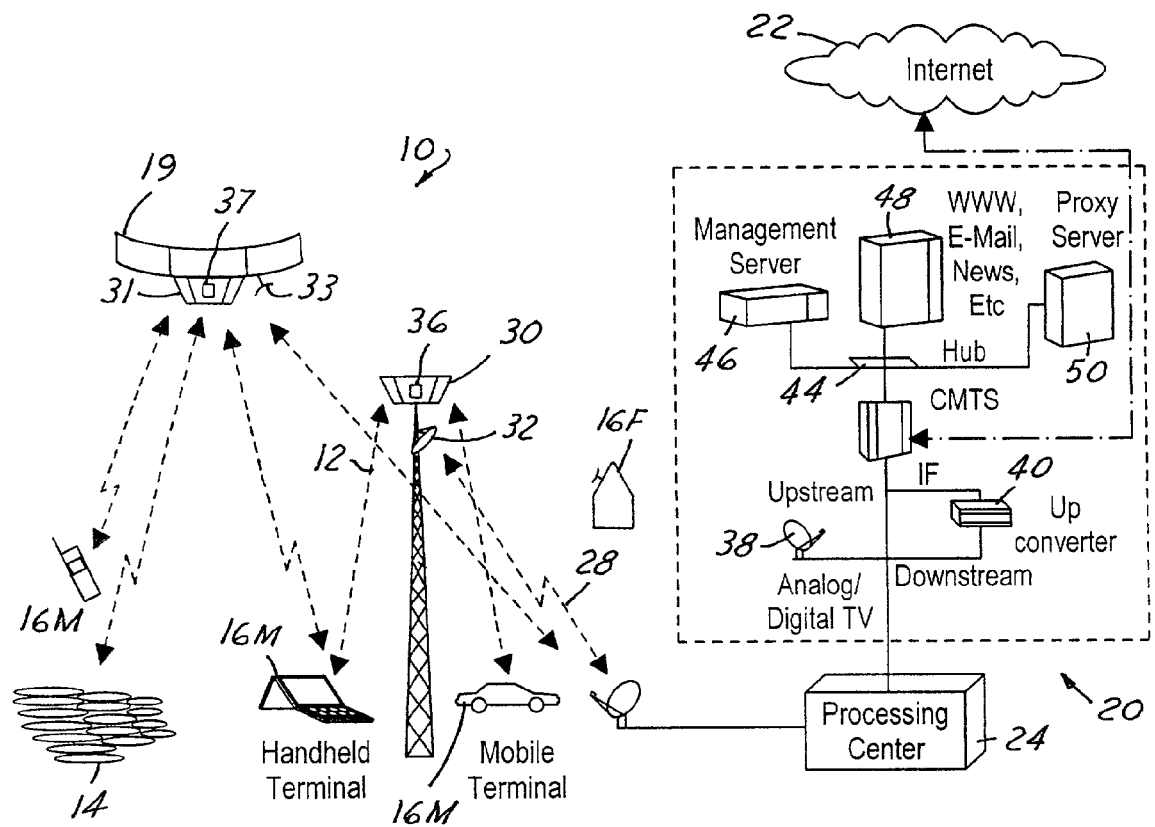
FIG. 1 is a system diagram of a communication system according to the present invention.

In the following description, the same reference numerals are used to identify the same components in the various views. Those skilled in the art will recognize that various other embodiments, structural changes and changes in measures may be made without departing from the scope of the invention. The teachings of the present invention may be used for both fixed users as well as mobile users.

Referring now to FIG. 1, a communications system 10 has a plurality of beams 12 that are illustrated as a plurality of circles 14 on the earth's surface. Circles 14 represent the footprint of a radiated beam onto the earth's surface. A plurality of user terminals 16M and 16F are used to illustrate mobile users and fixed users, respectively. Mobile users 16M may comprise but are not limited to automotive applications, personal digital assistant applications and cellular phone applications. Fixed user terminals 16F may, for example, comprise business-based or consumer-based communication systems. Each user terminal 16F and 16M may receive a signal with the predetermined signal strength from a communication beam or communication beams through multiple links from one or more base stations 18 or stratospheric platforms 19. The present invention is particularly advantageous for use with mobile terminals 16M.

Communication system 10 further includes a gateway station 20 that is coupled to terrestrial networks 22. Gateway station 20 may be coupled to a base station processing center 24. Gateway station 20 provides a links between user terminals 16F, 16M and terrestrial networks 22 through base stations 18 and stratospheric platform 19. Gateway station 20 may be coupled to terrestrial networks 22 such as the public service telephone network, the Internet, or an intranet. Although illustrated as two separate units, gateway station 20 and processing center 24 may be combined into the same physical location.

The communication signals between base station 18 and user terminals 16M and 16F may be referred to as user links 26. User links 26 represent the transmit and receive beams from both categories of user terminals 16F, 16M and base station 18. A feeder link 28 is defined between base station 18 and stratospheric platform 19 and gateway station 20.

Base stations 18 and stratospheric platforms 19 are used as a communication nodes for gateway station 20 and user terminals 16F and 16M. For communicating with user terminals 16M and 16F, base stations 18 and stratospheric platforms 19 have a respective adaptive antenna 30, 31 formed of panels of reconfigurable elements as will be further described below. Each base station 30 also has a directional antenna 32 for coupling to gateway station antenna 34. Each stratospheric platform has a directional antenna for coupling to gateway station antenna 34. The coupling of antennas 32 and 34 allows base station 18 to be wireless and therefore advantageously be easily deployed. As will be described below, the pointing from both mobile terminals 16M and base station 18 and stratospheric platform 19 may be performed electronically. Although only one gateway station 20 is illustrated in the figure, those skilled in the art would recognize that various numbers of gateway stations may be employed. Gateway station 20 has a gateway control circuit 23 that controls the content and communication with the base station 18.

Base station 18 has a controller 36 and stratospheric platform 19 has a controller 37 that links user terminals 16M, 16F through respective antenna 30, 31 with gateway station 20. In the present example, the controllers 36 and 37 are used in the return link direction to multiplex received signals from all the array element into the feeder link signals 28 as determined in the gateway station 20. Similarly in the forward link direction, controllers 36 and 37 are used to de-multiplex the feeder link signals into various streams of signals for array elements to transmit.

Gateway control circuit 23 may have various circuitry coupled thereto. For example, analog or digital TV 38, an up converter 40, and a cable modem terminal shelf (CMTS) 42. CMTS 42 may be used to couple to terrestrial networks such as Internet 22. CMTS 42 may be coupled to a hub 44 that has various resources coupled thereto. The hub 44 may, for example, have a management server 46, a world wide web, e-mail or news server 48 or a proxy server 50.

Referring now to FIGS. 2A, 2B, 2C, and 2D, antenna 30 is shown in further detail. In the illustrated embodiment, antenna 30 has five panels 52 that are used to direct communication signals to a desired direction. As is illustrated best in FIG. 2A, each panel 52 has a field of view and a scanning range slightly narrower than the field of view. Each panel is preferably a flat panel that allows cost effective multiple connectivity from base station 18 to the various users. Each panel 52 is used to establish multiple dynamic links. In combination, the various base stations together are used to form the communication signal with the users. Thus, multiple base stations through multiple panels 52 of antennas 30 are used in each communication. The bandwidth on demand is accomplished not by a variety of data rates via a single rf link but through different data rates resulting from various combinations of multiple dynamic rf links. As will be further described below, as the user moves, some links may fade away while new links may become available. Thus, multiple links will always be connected to a user. As illustrated, five panels are used, however, those skilled in the art will recognize various numbers of panels may be used.

Figure 2F:
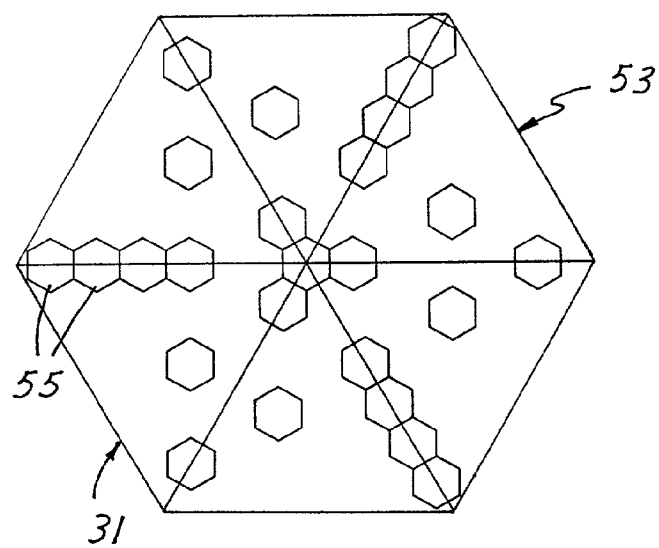
FIG. 2F is an alternative panel configuration according to the present invention.
Figure 2A:
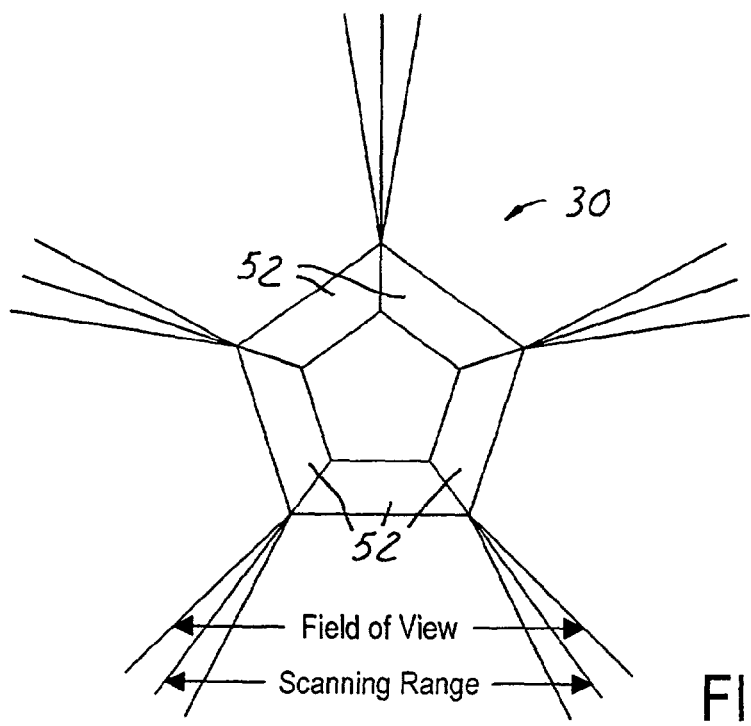
FIG. 2A is a top view of a base station antenna according to the present invention.

Referring now to FIG. 2F, antenna 31 is shown in further detail. In the illustrated embodiment, antenna 31 has six segments 53 that are used to direct communication signals to a desired location in a desired direction. Each segment is preferably a flat panel that allows cost effective multiple connectivity from stratospheric platform 19 to the various users. Each segment 53 is used to establish multiple dynamic links. In combination, the various stratospheric platforms 19 together are used to form the communication signal with the users. Thus, multiple base stations through multiple elements 55 of antennas are used in each communication. The bandwidth on demand is accomplished not by a variety of data rates via a single rf link but through different data rates resulting from various combinations of multiple dynamic rf links. As will be further described below, as the user moves, some links may fade away while new links may become available. Thus, multiple links will always be connected to a user. As illustrated, six segments are used, however, those skilled in the art will recognize various numbers of segments may be used. The segments may also be disposed at various angles relative to the ground plane similar to that shown in FIG. 2B above.

Figure 2B:
FIG. 2B is a side view of the base station antenna of FIG. 2A.

As is best shown in FIG. 2B, panels 52 have an angle 54 relative to the horizontal. Angle 54 allows the communication signals generated at panels 54 to be directed slightly downward toward the earth's surface. Of course, angle 54 depends on the height of base station 18 above the earth's surface. That is, as the height of the tower increases, the angle 54 decreases. The angle is such to give a desired service area for each panel 52.

In operation, the combination of simultaneous multiple beam capability on both the mobile terminals and base stations will make overall mobile systems even more cost effective. A user through their associated multiple beam user device or appliance will connect to an IP network by establishing multiple dynamic links through various base stations to the communication nodes of the Internet. As a result, precious mobile spectrum may be reused many times when mobile subscribers use directional antennas. The same amount of spectrum can be used again and again to increase the bandwidth density (i.e., total bandwidth a mobile system can project into a unit area). Therefore, the system will provide more throughput for users and larger capacity for the operators, and more efficient utilization for regulators. Providing a high gain on both user terminals and base stations allows the cell size to be extended extensively without impacting the bandwidth density. The bandwidth on demand will be implemented through multiple dynamic links and thus multiple links will always be available to a user. There may be many bases stations within a field of view of a mobile user. For example, there may be as many as between five and ten bases stations within a user's field of view. A user with an omni directional terminal may connect to one nearest base station with an rf channel (specified by frequency, time and/or code). This channel will not be assigned to other users as in a conventional cellular system. Adaptive antennas on base stations allow operators to use the same channel again within the same "cell" but via different base stations, provided the base stations have the capability to directionally discriminate against interferences at the same channel as that intended user but at different directions. As will be further described below, the user and interference sources must be located reasonably far to make the adaptive technique effective. The base stations may include circuitry to null or offset interferences between the communication signals. During an acquisition phase, e.g., from a cold start, all received beams will be "on" to cover the entire field of view of a fan beam. Thus, the various beams will have different elevation angles and azimuth angles to cover the search volume. Once a user link is established, only nearby beams from a particular panel 52 may be activated.

Once a user link is established, the tracking mechanism uses a type of step scan principle. The signal strengths from adjacent received beams will be monitored and compared with one coming from the main beam. The beam with the strongest signal will be identified as a "locked" or main beam. As a user moves, the tracking base station may switch (i.e., step) a received beam from one position to an adjacent one with the strongest signal, and assign the transmit beam accordingly.

Figure 2C:
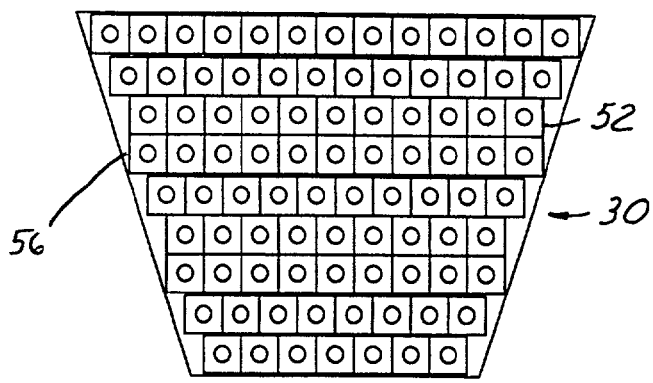
FIG. 2C is a side view of a panel of the base station of FIG. 2A illustrating elements thereon.

As is best shown in FIG. 2C, a panel 52 may be comprised of a plurality of radiation elements or patches 56. Radiation elements 56 may, for example, be described as a "patch array." As is illustrated, 90 elements are illustrated in FIG. 2C. Each element 56 has a diameter of 0.3 wavelengths. Element modules are placed at slightly less than 0.7 wavelengths apart in a nearly square lattice. Panel 52 may also be referred to as an "aperture." Panel 52 has a radiating area in the order of about 25 square wavelengths. The expected peak gain of a beam is 24 dB at the boresight, and about 22 dB at 45 degrees away from the boresight. Beam widths for the boresight elliptical beam is about 10 degrees in azimuth and 15 degrees in elevation respectively. The beams are dynamic and therefore assigned to track individual subscribers accordingly.

Figure 2D:
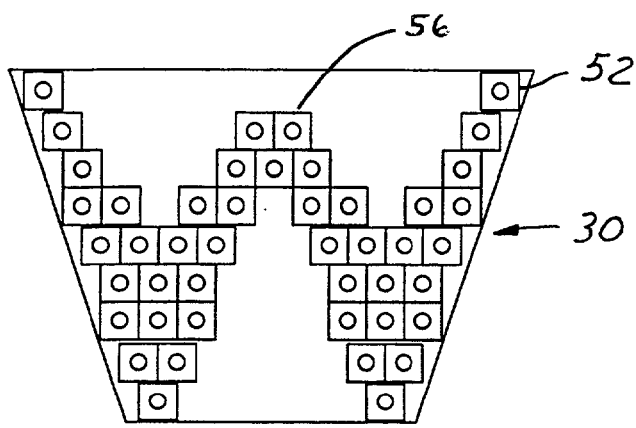
FIG. 2D is an alternative side view showing elements of a panel of a base station.

Referring now to FIG. 2D, a 45 element panel 52 is illustrated. Such a panel has about 3 dB less gain than that of the panel illustrated in FIG. 2C while maintaining about the same directional discrimination.

Figure 2E:
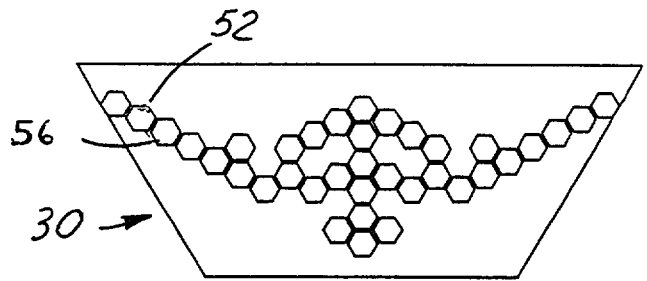
FIG. 2E is a third alternative embodiment of elements of a panel of an antenna according to the present invention.

Referring now to FIG. 2E, another element configuration of a flat panel 52 is illustrated for a high frequency application. In this embodiment, panel 52 has about 36 elements. In this embodiment, each element is approximately 0.6 wavelengths in diameter with element spacing slightly less than 0.7 wavelengths apart in a nearly square lattice. The total aperture has a rating area in the order of about 10 square wavelengths. The peak expected gain of the beam is about 20 dB at boresight and 18 dB 45 degrees away from the boresight. The beam widths for the boresight elliptical beam are about 5 degrees in azimuth and 15 degrees in elevation, respectively. Therefore, at 2 kilometers away from the base station, the beam width and azimuthal direction is about 200 meters. Of course, fewer elements may be used depending on the frequencies involved. That is for higher frequencies because more data is transferred, less elements may be required to match the processing power of the circuitry.

Referring now to FIGS. 2A, 2B, 2C, and 2D, antenna 30 is shown in further detail. In the illustrated embodiment, antenna 30 has five panels 52 that are used to direct communication signals to a desired direction. As is illustrated best in FIG. 2A, each panel 52 has a field of view and a scanning range slightly narrower than the field of view. Each panel is preferably a flat panel that allows cost effective multiple connectivity from base station 18 to the various users. Each panel 52 is used to establish multiple dynamic links. In combination, the various base stations together are used to form the communication signal with the users. Thus, multiple base stations through multiple panels 52 of antennas 30 are used in each communication. The bandwidth on demand is accomplished not by a variety of data rates via a single rf link but through different data rates resulting from various combinations of multiple dynamic rf links. As will be further described below, as the user moves, some links may fade away while new links may become available. Thus, multiple links will always be connected to a user. As illustrated, five panels are used, however, those skilled in the art will recognize various numbers of panels may be used.

For each of the above embodiments, long baselines, not full apertures, over a large bandwidth provide good directional discrimination capability. The thin array at a single frequency will exhibit high side lobes or semi-grading lobes. Over a large bandwidth, side lobes arise at various directions at different frequency components. As a result, the integrated interference contribution from side lobes over a large bandwidth tends to smear out or cancel while the contribution to the main lobe over the same bandwidth may be constructively added together. As will be further described below, additional cancellation schemes may be applied to reject interferences for all beams tracking to various subscribers if necessary.

Figure 3:
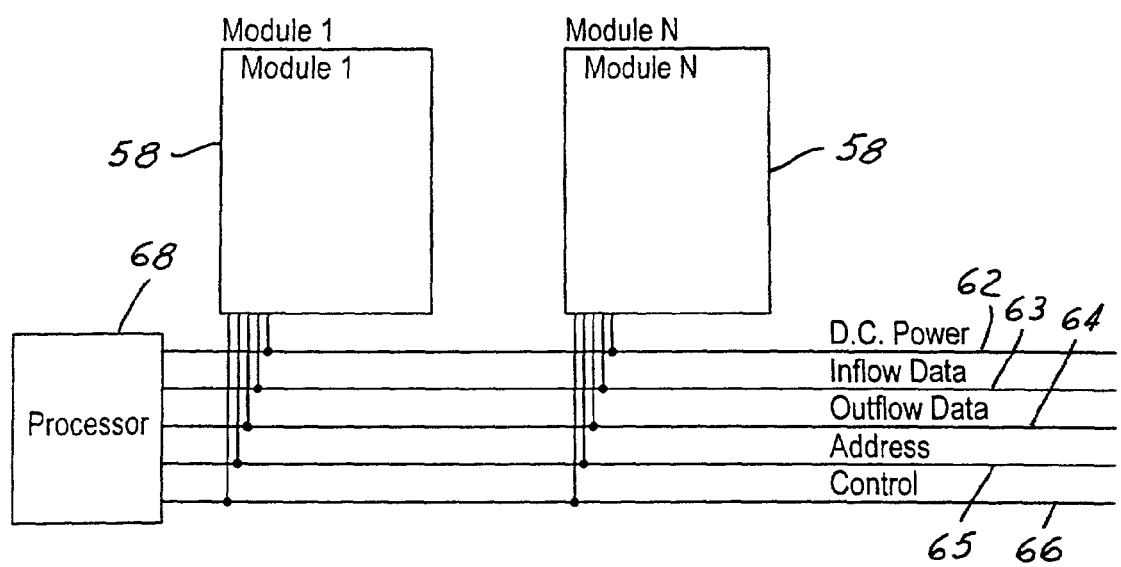
FIG. 3 is a high level block diagrammatic view of element modules coupled to a data bus.

Referring now additionally to FIG. 3, radiating elements 56 form modules 58 which are plugged into panels 52. Panels 52 serve as back plates which are interconnected through a bus 60. Bus 60, for example, may include a DC power line 62, an inflow data line 63, an outflow data line 64, an address line 65, and a control line 66. Panels 52 may be modularized and include sockets for easy connection and disconnection of modules 58. Each panel or back plate 52 may include a processor 68 to handle beam configuration. Processor 68 may be part of controller 36 described above in FIG. 1. The segments of FIG. 2F may also be configured in a similar manner, i.e., modularized.

Figure 4:
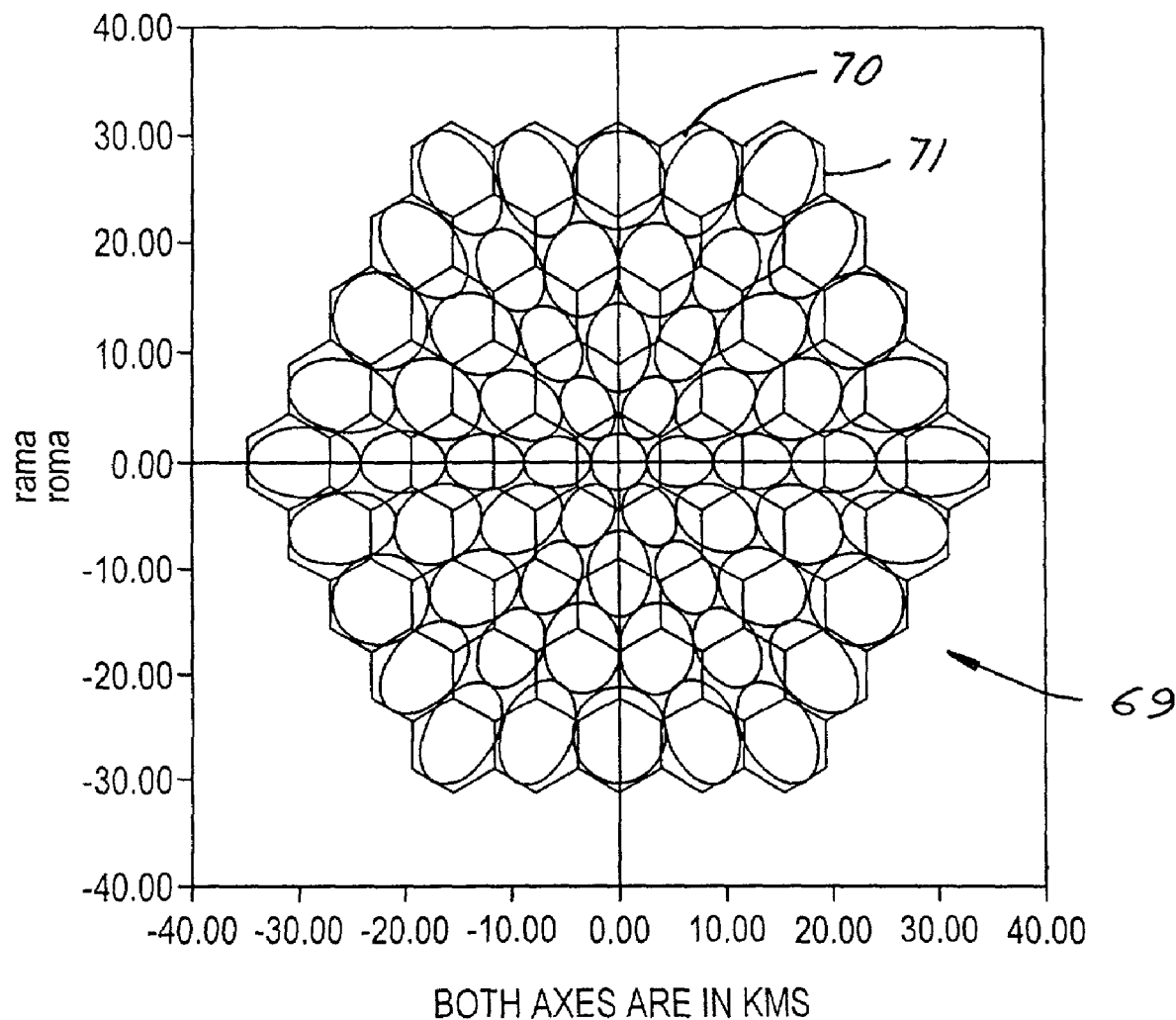
FIG. 4 is a beam pattern for the panel illustrated in FIG. 3.

Referring now to FIG. 4, a beam pattern 69 for the panel of FIG. 2F is illustrated. The pattern 69 has circles 70 or ellipses representing beam positioning patterns from a dynamic beam allocation and positioning scheme, while the hexagon 71 representing fixed beam positions from a conventional static cell system. Antenna 31 converts the received microwave power into a digital stream in the receiving direction and converts the digital stream into radiated microwave power in the transmitting direction. The phasing of various elements is implemented by digital multiplication in a separated digital beam former. The digital beam forming approach eliminates the need of conventional phase shifters and minimizes required rf components, making possible a low cost implementation suitable for the consumer market.

Figure 5:
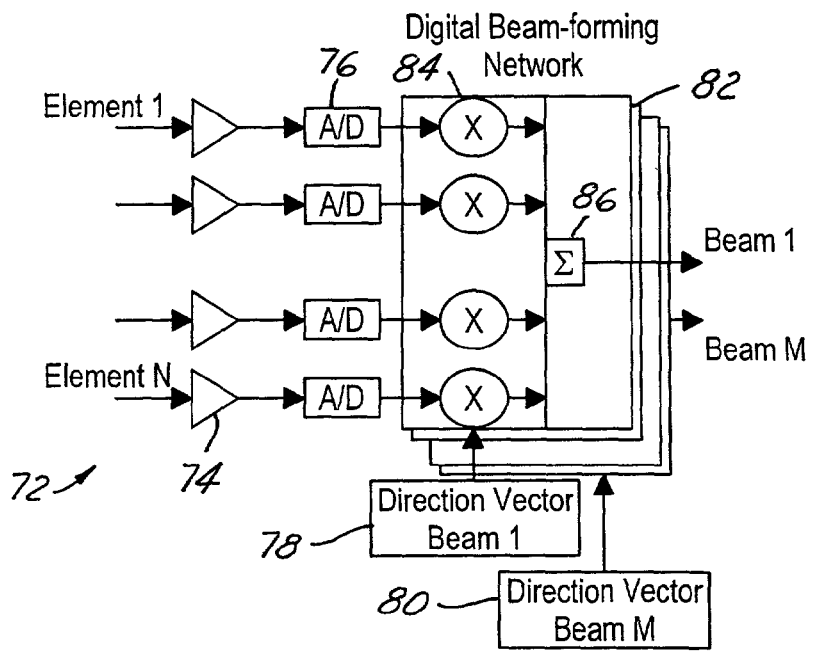
FIG. 5 is a block diagrammatic view of a digital beam forming circuit according to the present invention.

Referring now to FIG. 5, a digital beam forming circuit 72 is illustrated for a base station or stratospheric platform (of FIG. 1). However, a similar beam forming circuit may also be used for a user device. Also, a receive beam forming network is shown, however, those skilled in the art will recognize a corresponding transmitting beam forming circuit may be formed in reverse.

Digital beam forming circuit 72 has a plurality of elements 74. Various groupings of elements 74 are used to generate the simultaneous multiple links of the present invention. Each element 74 is coupled to a corresponding analog-to-digital converter. As those skilled in the art will recognize, a band pass filter (not shown) may also be coupled between element 74 and analog-to-digital converter 76. The digital outputs from all of the analog-to-digital converters 76 are weighted and summed, then grouped together to form beams 1 through M as illustrated. The beams are formed by numerical multiplications using the direction vector beam 1 as illustrated as reference numeral 78 and through direction vector beam M as illustrated by reference numerals 80 through forming circuit 82. Forming circuit 82 may have a plurality of multiplication blocks 84 and summing blocks 86 either implemented physically or in software to form the various beams. Functions of beam forming, frequency tuning and time synchronization are interlaced to minimize the over processing mode, instead of sequentially. This approach eliminates conventional phase shifters and minimizes the required rf components making the implementation suitable for consumer applications. Digital beam forming circuit 72 is used to generate multiple simultaneous links with base station 18. The digital beam forming circuit 72 is configured such that a unique beam is assigned for each individual user. The base stations will track users with unique channels and beam positions. Every user will have a bubble which is the beam size associated with the assigned beam. The bubble forms an exclusion zone associated with each user for a specific channel. Users assigned with the same channel can co-exist in a network as long as their associated bubbles do not intercept one another. When bubbles for a particular channel collide, one user is assigned a new channel.

Direct samplings are used to simplify the architecture. Low cost is achieved by the use of an analog-to-digital converter 76 that allows analog-to-digital conversion of the received signals at rf directly allowing other processing to be performed digitally. High speed and low speed analog-to-digital conversion will over sample the received signals. In one constructed embodiment, a user signal is assumed to be about 5 MHz but could go as high as 30 MHz. A sampling rate was chosen to be about 20 MBps per second with approximately a 4-bit resolution. Aperture time of the analog-to-digital converter must less than one-eighth of the period of the carrier frequency. Therefore, at a 2 GHz carrier frequency, the aperture time of about 50 picoseconds is adequate.

Figure 6:
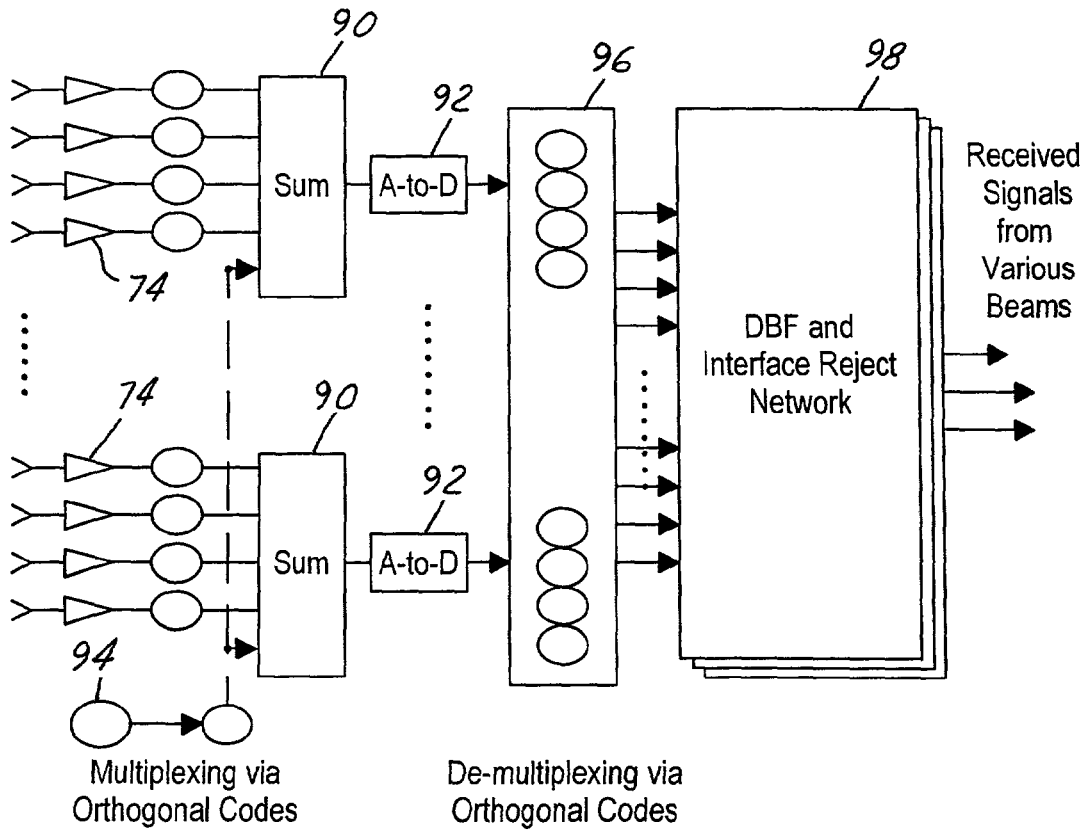
FIG. 6 is a block diagrammatic view of a beam forming circuit using noise injection according to the present invention.

Referring now to FIG. 6, an alternative to the circuit configuration of FIG. 5 is illustrated. In this embodiment, the number of analog-to-digital converters is reduced and the dynamic range required for the individual analog-to-digital converters is also reduced. In the circuit of FIG. 6, element 74 may be weighted in block 88 before a summer 90. Summer 90 is used to group a number of elements together. Each summing block 90 has an analog-to-digital converter 92 associated therewith. Thus, by grouping a number of elements together with a summing block 90, the number of analog-to-digital converters is thus reduced. Each summing block 90 may also be connected to a noise injection circuit 94. Structured noise may be added to the summing block 90. The structured noise may consist of orthogonal codes. A similar technique is described in U.S. Pat. No. 5,077,562 which is incorporated by reference herein.

Each analog-to-digital converter 92 is coupled to demultiplexer 96. Demultiplexer 96 is coupled to digital beam forming and interference rejection network 98. Demultiplexer 96 demultiplexes the outputs from analog-to-digital converters 92 and provides them to digital beam forming and interference rejection network 98. Digital beam forming and interference rejection network provides a received signal to be processed by the processing center.

Figure 7:
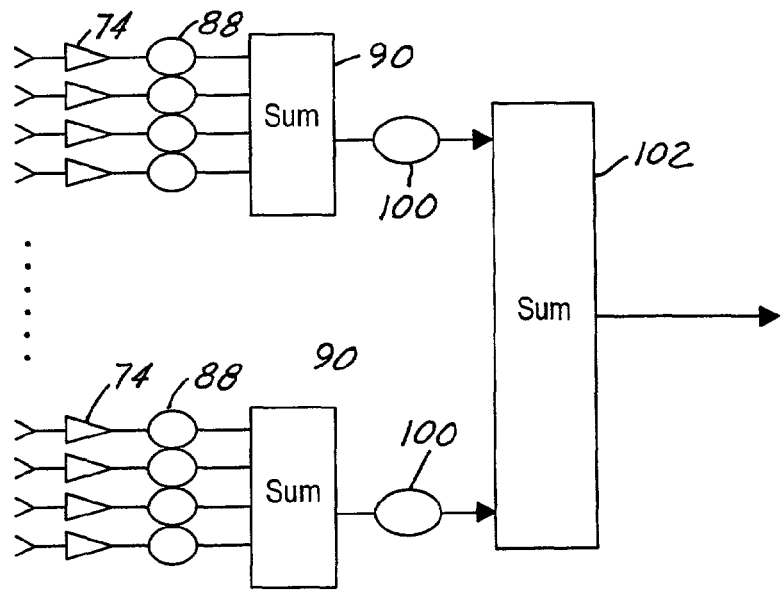
FIG. 7 is a block diagrammatic view of a base station processing circuit according to the present invention.

Referring now to FIG. 7, a similar embodiment to that shown in FIG. 6 above is illustrated. In this embodiment, a portion of the circuit may be located in base station while the remaining portion of the circuit may be located in a processing center. By removing some of the circuitry from a base station, a less costly and more flexible system may be obtained. The same reference numerals are used for the same elements in FIG. 7 as in FIG. 6. Elements 74 are coupled to weighted block 88 which in turn are coupled to summers 98. A weighted block 100 is used after summer to couple summer 90 with a central summing block 102. The signal from summing block 102 is thus broadcast or transmitted to the gateway station for further processing.

Figure 8:
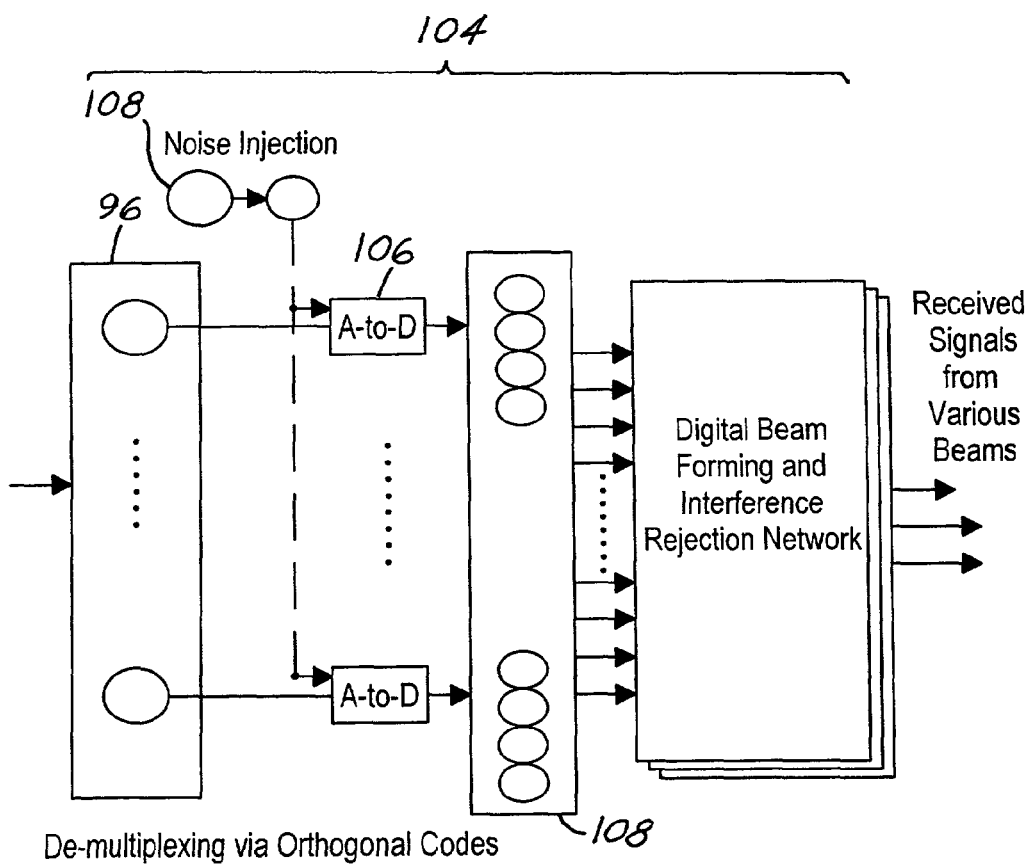
FIG. 8 is a block diagrammatic view of a gateway processing station according to the present invention.

Referring now to FIG. 8, a gateway portion 104 of the circuit illustrated in FIG. 7 is illustrated. A demultiplexer 96 similar to that illustrated above is used. Demultiplexer 96 demultiplexes the broadcast signal from summer 102 and provides it to an analog-to-digital converter 106. Analog-to-digital converter 106 may be coupled to noise injection circuit 108. Noise injection circuit 108 may be similar to that described above in that noise injection circuit 108 may use orthogonal codes. The output of analog-to-digital converter is provided to a demultiplexer portion 108 which in turn is coupled to digital beam forming and interference rejection network 98 similar to that in FIG. 6. Thus, digital beam forming network and digital interference rejection network provides received signals from the various beams. By providing the demultiplexing analog-to-digital conversion and noise injection all in one location such as the gateway station, the complexity of the base stations may be reduced. Further, the number of elements provided at a base station may be increased due to the remote processing of the beam signal.

Figure 9:
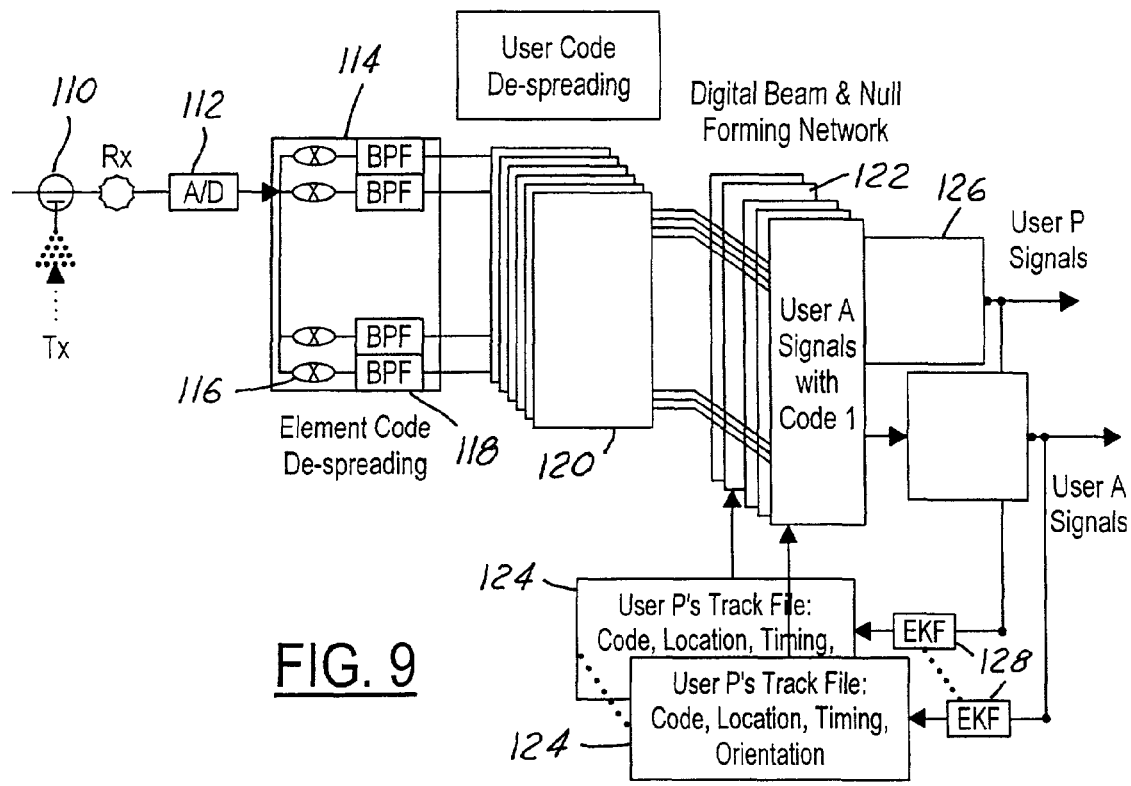
FIG. 9 is a more detailed schematic view of a demultiplexing beam forming and nulling circuit according to the present invention.

Referring now to FIG. 9, a more detailed processing scheme for a CDMA system, such as $3^{rd}$ generation mobile, from that shown in FIGS. 8 is illustrated. In this embodiment, a diplexer 110 is connected to a radiator (not shown) so that both transmit and receive signals are through the same radiator. Only the receive functions are illustrated. The corresponding transmit functions are identical but in a reversed direction. The received multiplexed signals are coupled to an analog-to-digital converter 112. To simplify the block diagram, we did not include the noise injection portion in here. Following analog-to-digital converter 112 a element code despreading circuit 114 has a plurality of multiplication blocks 116 which performs the matched filter function via a multiplication 116 and a band pass filter 118, to recover the signal received at a specific array element in digital representation. Therefore at the outputs of the de-spreading block 114, the received signals of all the array elements at the remote base stations have been re-generated in digital forms. The regenerated signals are available for further processing.

A scheme in which every user will have a dedicated beam is illustrated. The received element signals by user codes are sorted element by element before beam forming. More than one user per code is used but they come from different directions and arriving at different time.

Element code despreading circuit 114 is coupled to a user code despreading circuit 120. Each user code is used to group multiple users with the same user code together in user code despreading circuit 120. Different users may only be separated via time delay and direction of arrival. Thus the block 120 must provide digital streams with multiple taps to beam forming network so that the user signals with the same user code can be separated via time and directional "filtering processes." Each user code from user code despreading circuit 120 is coupled to digital beam and null forming network. One digital beam and null forming network is provided for each user. Track files 124 provide input to digital beam forming and null forming network 122. Track files include information such as the user code, the location, timing and orientation of the users. Track files allow the communication signals to be divided into several links for communication through a number of base stations. The user signals after digital beam forming are output and coupled to such things as the Internet. Feedback is provided from output 126 through an extended Kalman filter. The extended Kalman filter 128 is used to update each user position channel and potential for interference or collision with neighbors. The information from the extended Kalman filter 128 will be used to track the corresponding user.

Figure 10:
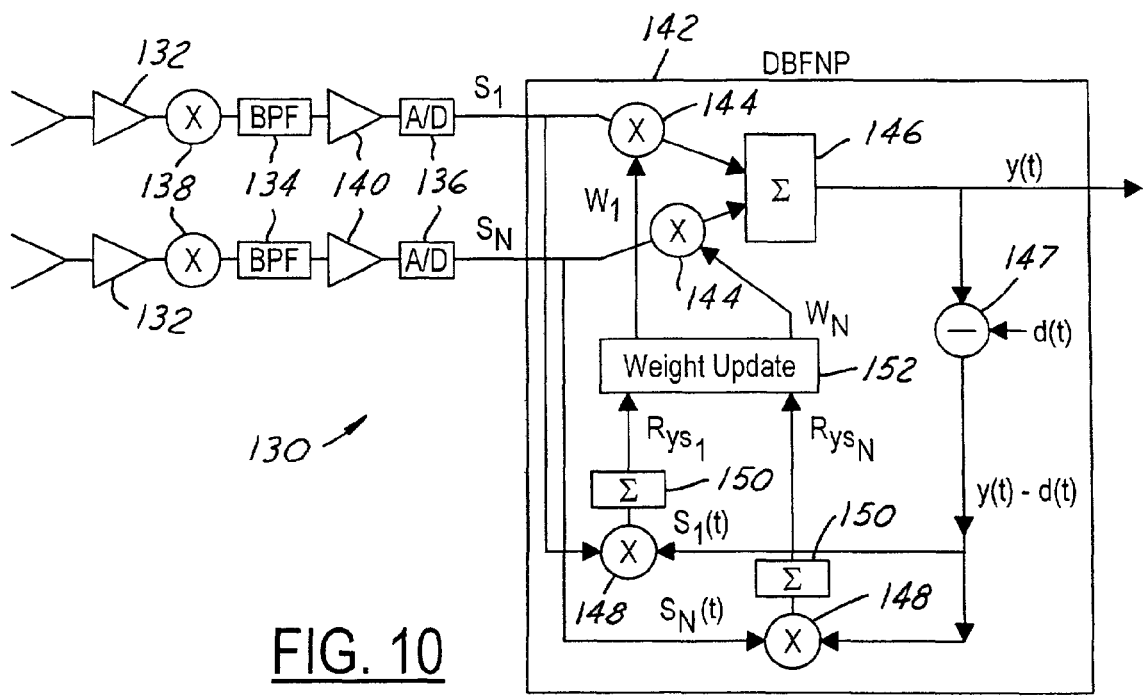
FIG. 10 is an alternative for the remote processor; an adaptive digital beam forming and nulling processor according to the present invention.

Referring now to FIG. 10, an adaptive nulling circuit 130 that could be used with any of the circuits in FIGS. 7 through 9 is illustrated. For example, the circuit 142 of FIG. 10 may be implemented as a part of element 122 of FIG. 9. Circuit 130 has elements 132 which are coupled to a beam forming circuit 134 and an analog-to-digital converter 136. Of course, as mentioned above, this portion of the circuit may be similar to that shown in FIGS. 7 through 9. A multiplication block 138 and amplifier 140 may also be included in the circuit. A digital beam forming and nulling processor 142 is coupled to each analog-to-digital converter. Each signal is multiplied by a weight at multiplication block 144 prior to being summed at a summer 146. The output of summer 146 is the output signal $Y_{(t)}$. In a typical digital beam forming, the directional vector (the multiplier set) is pre-determined by pointing direction only, and usually will exhibit a linear phase progression on the array apertures for spot beams. However, in the adaptive beam forming and nulling network illustrated, the directional vector will be further modulated by signal environment, such that a beam is directed toward desired user while nulls are steered toward high interference directions. As a result the received signal to noise (including interference) ratio is "maximized." Negative feedback block 147 is provided from output signal $Y_{(t)}$ to a multiplication block 148 for each signal. The multiplication block 148 multiplies the input signal from each analog-to-digital converter with the output signal $Y_{(t)}$. A sum through summer block 150 is provided to a weight update block 152. Weight update block 152, thus in response to the multiplication block 148, updates the weights and provides those to multiplication blocks 144. The output is thus, $$Y(t) = \sum_1 W_y \hat{S}_t(t)$$

$$\frac{dw}{dt} = -\alpha \nabla_w \varepsilon$$

$$(\nabla_w \varepsilon)_1 = 2\langle y(t) - d(t) * S_1(t)\rangle$$

Our method for adaptive nulling to use a least mean square criteria for steady state solution. In addition, a steepest descent technique may be used to reach the steady state solution. An indirect correlation technique is used, rather than a direct perturbation technique, to measure the "gradients" for each update.

Figure 11:
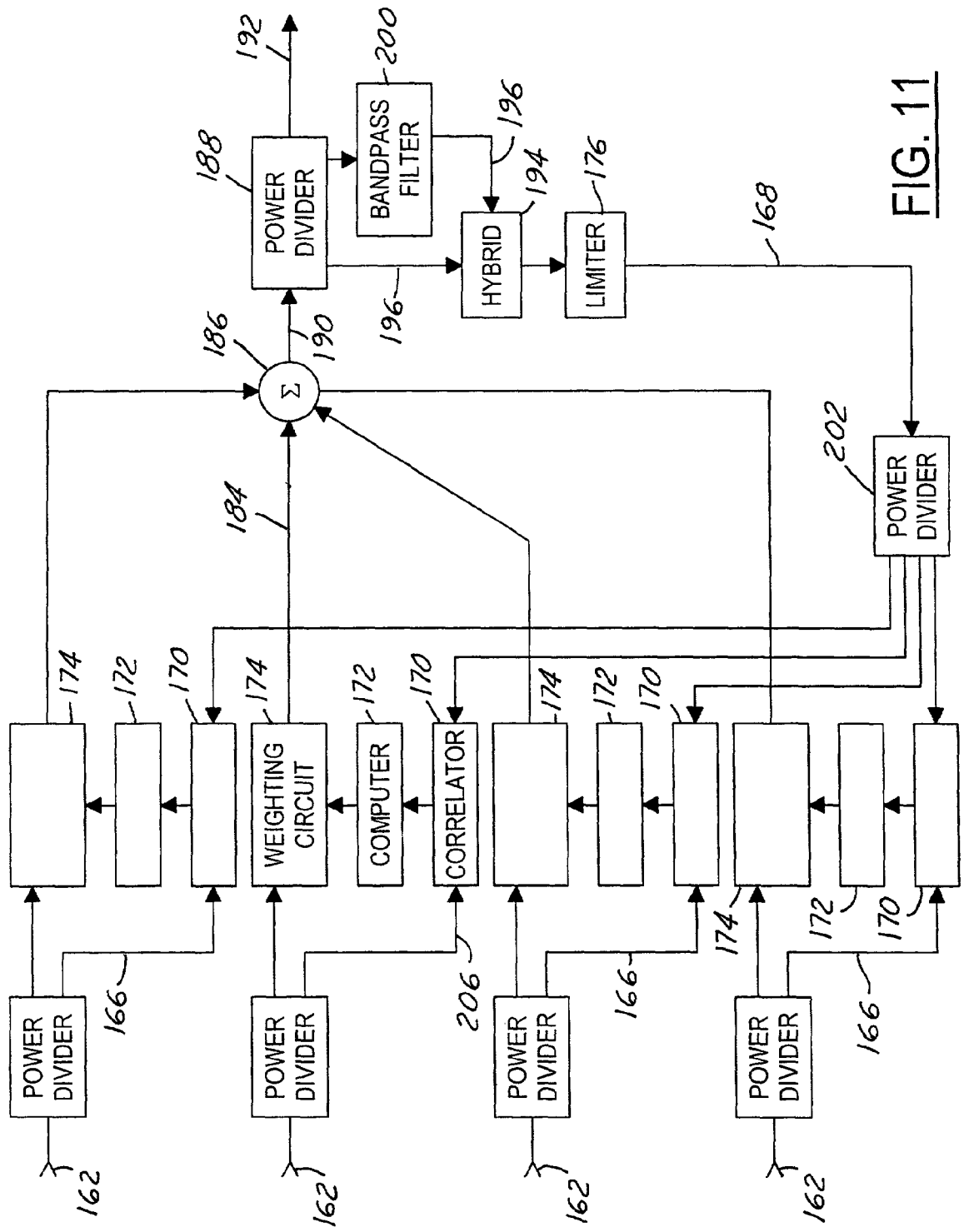
FIG. 11 is an alternative nulling circuit with a limiter on the feedback path according to the present invention.

Referring now to FIG. 11, to reduce cost and enhance the nulling efficiency, a limiter may be placed in the feedback path similar to the techniques described in U.S. Pat. No. 4,635,063, which is hereby incorporated by reference. Limiting circuit 160 includes elements 162 similar to those described above. Each element has an associated main channel 164, a feedthrough path 166, and a feedback path 168. Since the circuitry associated with the respective elements are essentially the same, the circuitry associated with only one sensor is referenced in detail. The function blocks can all implemented in digital format. For Instance, power dividers correspond to data bus, weight circuits to multipliers, correlators to processors combining multipliers and integration-&-dumps, outputs of hard limiters to sign bits, and so on.

Correlators 170 co-process signals in the feedthrough path 166 and feedback path 168; the result is transformed according to an algorithm by a computer 172. The weighting circuit 174 thus progressively modifies the signal in the main channel 164 to minimize interference with a desired signal.

A limiter 176 is placed along feedback path 168. As explained below, this placement simplifies correlator design relative to the circuit without such limiters and improves performance relative to adaptive antennas with limiters in the feedthrough path.

Each element 162 is connected via the respective main channel 164 to respective input power divider 180 or other means for dividing an input signal between a pre-processed signal and a diagnostic signal. A diagnostic signal is conveyed along the respective feedthrough path 166; the pre-process signal is conveyed along a second portion 182 of the respective main channel 164.

The amplitude and phase of pre-process signals may be modified by weighting circuit 174 or other weighting means associated with each of the elements 162. The resulting weighted signals are directed along a third portion 184 of respective main channel 164 to be summed by means such as a power combiner 186. Means such as an output power divider 188 inserted along a unified portion 190 of main channel 14 between the power combiner 186 and antenna output 192, divides the summed signal between an output signal and a feedback signal.

The illustrated feedback path 168 includes means for eliminating from the feedback signal the desired band of frequencies associated with the primary signal source to be received by circuit 160. This means may include a hybrid 194 for subtracting the desired band from a portion of the summed signal. More particularly, hybrid 194 includes a primary input 196 and a secondary input 198. The primary input 196 receives a portion of the summed signal from output power divider 188. The secondary input 198 receives only the part of the summed input with the desired band. The desired band may be provided by means of a band pass filter 200, the input of which is a portion of the summed signal directed thereto by output power divider 188. The output of hybrid is the summed signal less the desired band. The elimination of the desired band from the feedback signal avoids possible nulling against the desired signal source. The limiter 176 is located in feedback path 168 so that limiting occurs prior to division of the feedback signal. Thus, the need for plural limiters is obviated. Preferably, limiter 176 is a hard limiter. Ideally, a hard limiter transforms a sinusoidal input to a square wave output.

The limited feedback signal is divided by means such as power divider 202 to provide feedback signals to provide feedback inputs 204 of correlators 170. The feedback signal is correlated with the diagnostic signal received at feedthrough input 206 of each correlator 170. The preferred correlator 170 is a multiplier coupled with a low pass filter.

Each correlation resultant is transformed according to an algorithm by computer or processor 172 or alternative means. The transform is used to determine the weighting function of the weighting circuit 174 or other weighting means. Preferably a gradient descent algorithm such as least means square error, Howell-Applebaum power inversion, is used.

Some of the advantages of the present invention can be better understood in accordance with the following theoretical analysis. The function of the ideal hard limiter is to produce a high constant level positive output whenever the input is positive and a low constant level negative output whenever the input is negative. The transition between the constant positive and negative output values (or the threshold values) is a sharp or discontinuous one. Therefore, with a sinusoidal input the output would ideally be a square wave. In a multiple signal environment where the signal power differences are large (e.g., more than 10 dB), the limiter will suppress weaker signals and enhance the strongest signal. Qualitatively, the limiter will only respond to the strongest signal.

In a phased array geometry, each element shares the same field of view as every other element. Therefore, each element plays a nearly equal role in forming a single beam. All jamming signals in the field of view are sensed by every single element in the phased array. Consequently, the positioning of the limiter in either the feedthrough path or the feedback path is critical for multi-interference rejection in the phased array.

If the limiter is placed in the feedthrough path, its output will have merely the information of the strongest interference, and the antenna system will null against the strongest interference accordingly. The correlator outputs will not include any of the other interference signal information to allow the antenna system to form nulls in their directions.

Alternatively, when a hard limiter is placed in the feedback path, the antenna system can first null against the strongest interference signal until it becomes comparable to the second strongest. The antenna system will then null against both until the antenna system reaches an inherent threshold level, created by quantization error or feedback loop gain, limiter, etc.

FIG. 12 shows a comparison of the interference suppression performance and the convergence rate of three four-element phased array configurations: (a) no limiter, (b) limiters in the feedthrough path, and (c) limiter in the feedback path. These results were obtained from a computer simulation program, ADAPT and are the dynamic spectral output versus the number of iterations of the adaptive process.

Figure 12A:
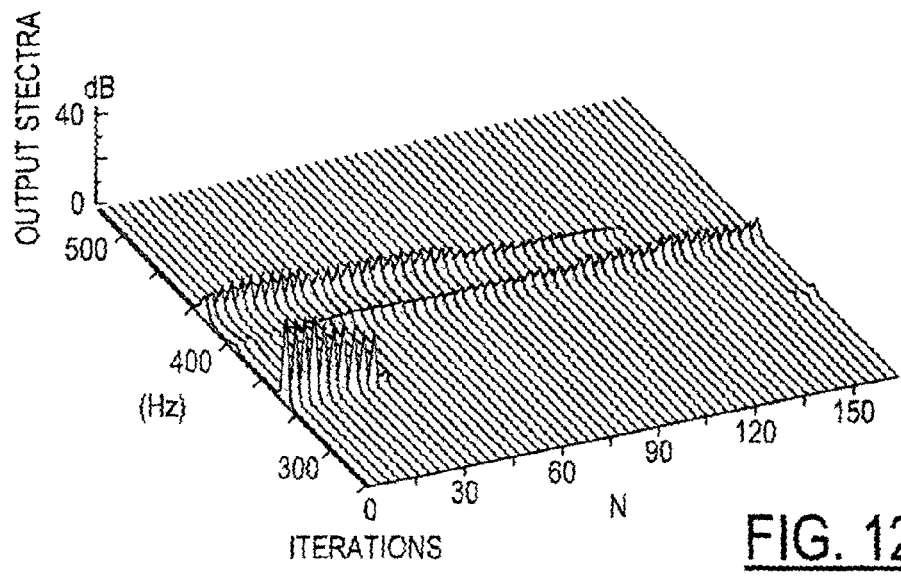
FIG. 12A is an output of a digital beam forming circuit not including limiter as shown in FIG. 10.

As the adaptive process proceeds from the initial state in the configuration with no limiter, the strongest interference is monotomically reduced until it is below the threshold value at iteration 37, as show in FIG. 12A. The threshold value is set 35 dB below the strongest interference. The weaker interference was not a driving force until iteration 34. At this point, the weaker interference is slowly but continuously suppressed. At iteration 126, the interference signal is below the threshold value. During the adaptation, the desired signal power density at the output is continually being enhanced until it reaches a steady state value of 10 dB above the threshold at iteration 134. The system configuration works but it needs high dynamic range correlators. In order to reduce high dynamic requirement on correlators, limiters are incorporated in the many modified options, as shown below.

Figure 12B:
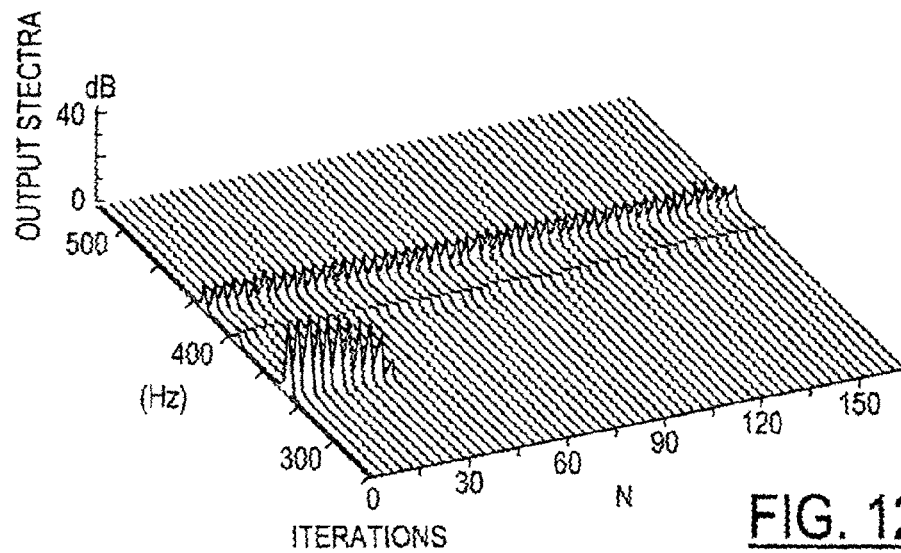
FIG. 12B is an output of the circuit of FIG. 10 with limiters at all feed-through paths.

In the configuration with the limiter in the feedthrough path, the power density level of the stronger interference is successively reduced below threshold but the power density level of the weak interference increases initially and remains at that steady state value as shown in FIG. 12B. The desired signal increases slightly in value, but is never enhanced above the weak interference. This system does not respond adequately to the weaker interference signals.

Figure 12C:
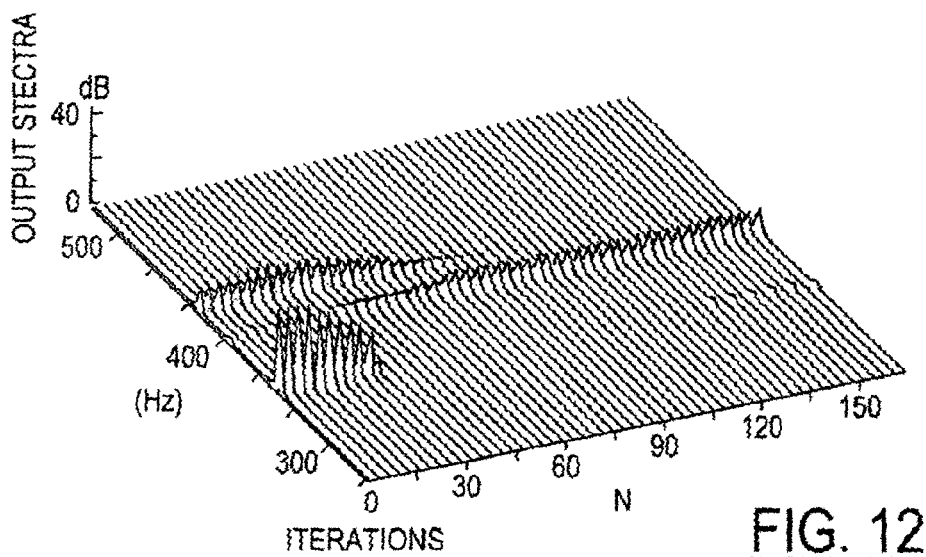
FIG. 12C is an output of circuit shown in FIG. 11 with limiter on the feed-back path, wherein the power density levels of both the weak and strong interference is successfully reduced below a threshold.

In the configuration with the limiter in the feedback path, the power density levels of both the weak and strong interference are successfully reduced below the threshold as seen in FIG. 12C. As compared to the configuration with no limiter, the weaker interference is suppressed slightly faster. The weak interference is below threshold at iteration 87. Throughout this process, the desired signal is continuously enhanced.

In accordance with the above, it can be seen that the present invention provides for improved performance over the no-limiter and limiter in the feedthrough path designs of the prior art. The present invention further improves on the feedthrough limiter version by requiring only one limiter, and improves upon the no-limiter version in relieving the design requirements on the correlators.

Figure 13:
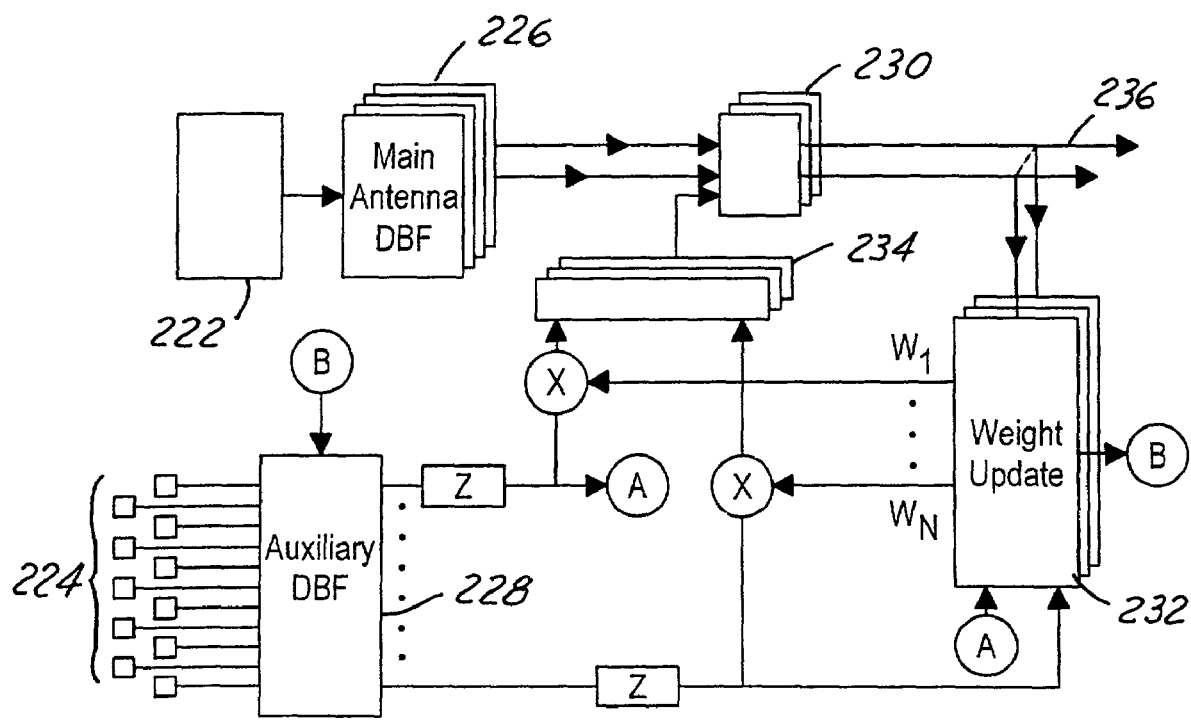
FIG. 13 is an alternative digital beam forming and nulling processor using auxiliary elements.

Referring now to FIG. 13, another circuit 220 to provide nulling is illustrated. In this embodiment, a plurality of main array elements 222 and auxiliary elements 224 is illustrated. Main array elements 222 are similar to the elements described in the previous circuit. Auxiliary elements 224 have been added to provide canceling of side lobes from the main elements. This will provide the capability to allow users to be closer together without interference. Main array elements 222 are coupled to a main digital beam forming circuit 226. Auxiliary elements 224 are coupled to an auxiliary digital beam forming circuit 228. A summing block 230 sums the signals from the main array elements through main digital beam forming circuit 226 with weighted portions of auxiliary elements to cancel interference. Feedback is provided through a weight update block 232. Weight update block 232 generates a weight for each of the user signals and provides them to a multiplication block where they are combined with the output of auxiliary digital beam forming circuit 228. The output of digital beam forming circuit may also be coupled to weight update block 232 to allow the weights to be formed as a function of the auxiliary digital beam forming input. The weighted auxiliary digital beam forming signals are combined in a summer 234 where they are combined with each of the auxiliary digital beam forming circuits and provided summer 230 for providing interference cancellation. Thus, output 236 of circuit 220 has the main user signals interference compensated for by the auxiliary elements 224.

In operation of FIG. 13, main array elements 222 are used to generate the communication beams of the present invention. The auxiliary elements 224 are used to cancel interference from the main array elements as needed. That is, by using the positions of the users, weights may be determined for auxiliary elements 224 so that the auxiliary elements 224 will have an auxiliary element output to cancel interference from the communication beams because of the direction of strong interfering sources for each active beam may be determined from the user position. Preferably, this is performed in the gateway station to prevent complexity in the base station. As those skilled in the art will recognize, it is the side lobes of the main beam that are to be canceled. By providing the auxiliary elements, the side lobes of the main beams may be reduced or selectively canceled by the auxiliary element outputs. Each panel described above may include canceling of the side lobes using auxiliary elements.

Advantageously, by providing the digital beam forming in the gateway station, all of the beams are formed in a real time manner using the user position files that exist in the gateway station. As the system needs change, the gateway station may adaptively change the output of the auxiliary elements on a continual basis.

While the best modes for carrying out the invention have been described in detail, those familiar with the art to which this invention relates will recognize various alternative designs and embodiments for practicing the invention as defined by the following claims.

What is claimed is:

1. A communications system for communicating with a plurality of users comprising:
    a high altitude device having an adaptive antenna having a first plurality of panels, each panel having a plurality of main array antenna elements for simultaneously generating a plurality of dynamic communication beams for the plurality of users;
    a gateway station coupled to said high altitude device, said gateway station forming a plurality of beam commands for each of the plurality of panels by communicating a plurality of control signals to the high altitude device station to form the plurality of dynamic communication beams so that a unique beam is assigned to and moves with each individual user.

2. A communications system as recited in claim 1 wherein said high altitude device comprises a stratospheric platform.

3. A communications system as recited in claim 1 further comprising a first plurality of wireless base stations having adaptive antennas with a plurality of first main array antenna elements for generating a plurality of communication beams to communicate with a fixed user.

4. A communications system as recited in claim 1 further comprising a first plurality of wireless base stations having adaptive antennas with a plurality of first main array antenna elements for generating a plurality of communication beams to communicate with a mobile user.

5. A system as recited in claim 1, wherein said adaptive antenna comprises an auxiliary element having an auxiliary element output, wherein said auxiliary element output is a function of a direction of the plurality of the communication beams.

6. A system as recited in claim 1, wherein said adaptive antenna comprises an auxiliary element having an auxiliary element output, wherein the gateway station comprises a plurality of multiplication gates each having a respective weight, said auxiliary element output being a function of said weight.

7. A communications system as recited in claim 1 wherein said high altitude device comprises a plurality of auxiliary elements for canceling interference with at least one of the plurality of beams.

8. A system as recited in claim 1, wherein said ground station is coupled to a terrestrial network.

9. A system as recited in claim 8, wherein said terrestrial network comprises the Internet.

10. A system as recited in claim 8, wherein the terrestrial network comprises the public service telephone network.

11. A communications system for communicating with a plurality of users, comprising:
    a ground station having;
    a beam generator for generating a plurality of beam control signals,
    a digital beam former circuit receiving the beam control signals and generating a plurality of first element control signals for multiple dynamic communication beams for the plurality of users, an rf subsystem for communicating an rf signal corresponding to the control signals;
    a stratospheric platform having;
    an adaptive antenna having a plurality of panels each having reconfigurable elements;
    a payload receiver for receiving the rf signals,
    a demultiplexer demultiplexing the rf signals into a second plurality of element control signals corresponding to the first element control signals and simultaneously generating a plurality of multiple dynamic communication beams from the reconfigurable elements of each panel for the plurality of users in response to the second plurality of element control signals so that a unique beam is assigned to and moves with each individual user.

12. A system as recited in claim 11, wherein said ground station comprises a gateway station.

13. A system as recited in claim 11, wherein said ground station is coupled to a terrestrial network.

14. A system as recited in claim 13, wherein said terrestrial network comprises the internet.

15. A system as recited in claim 14, wherein the terrestrial network comprises the public service telephone network.

16. A method of controlling a communications system having a stratospheric platform with a phased array antenna with a plurality of panels each having reconfigurable main array elements, said method comprising the steps of:
    in a gateway station, forming a plurality of control signals for generating multiple dynamic communication beams at each of the plurality of panels using track files within the gateway station;
    coupling the control signals for multiple dynamic communication beams to a plurality of stratospheric platforms; and
    simultaneously generating the multiple dynamic communication beams at each of the plurality of panels for a plurality of users in response to the control signals so that a unique beam is assigned to and moves with each individual user.

17. A method as recited in claim 16 further comprising forming a plurality of auxiliary element outputs by weighting auxiliary element control signals.

* * * * *